(12) United States Patent
Hardie et al.

(10) Patent No.: US 7,411,917 B1
(45) Date of Patent: Aug. 12, 2008

(54) METHOD AND SYSTEM FOR PROVIDING REGISTRATION-BASED SIP NAT TRAVERSAL

(75) Inventors: Terry Hardie, Union City, CA (US); Troy Pummill, Soquel, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 916 days.

(21) Appl. No.: 10/810,344

(22) Filed: Mar. 26, 2004

Related U.S. Application Data

(60) Provisional application No. 60/458,549, filed on Mar. 26, 2003.

(51) Int. Cl.
*H04L 12/28* (2006.01)
(52) U.S. Cl. ............... 370/252; 370/261; 370/392; 370/410
(58) Field of Classification Search ............... 370/252, 370/261, 392, 410
See application file for complete search history.

(56) References Cited

U.S. PATENT DOCUMENTS

| | | | |
|---|---|---|---|
| 6,359,896 B1 * | 3/2002 | Baker et al. | 370/410 |
| 6,829,769 B2 * | 12/2004 | Cranston et al. | 719/312 |
| 6,993,595 B1 * | 1/2006 | Luptowski et al. | 709/245 |
| 7,197,560 B2 * | 3/2007 | Caslin et al. | 709/224 |
| 7,272,650 B2 * | 9/2007 | Elgebaly et al. | 709/227 |

* cited by examiner

*Primary Examiner*—Edan Orgad
*Assistant Examiner*—Jay Patel
(74) *Attorney, Agent, or Firm*—Townsend and Townsend and Crew

(57) ABSTRACT

A system for providing network access translation device traversal to facilitate communications is provided. The system includes a network access translation (NAT) device, a first Session Initiation Protocol (SIP) client located on the interior of the NAT device, a second SIP client located on the exterior of the NAT device, and a proxy server configured to maintain registration information relating to the first SIP client and the NAT device. The proxy server is further configured to allow the second SIP client to initiate contact with the first SIP client and establish a communication session using the registration information. The communication session is established by traversing the NAT device.

30 Claims, 1 Drawing Sheet

METHOD AND SYSTEM FOR PROVIDING REGISTRATION-BASED SIP NAT TRAVERSAL

CROSS-REFERENCES TO RELATED APPLICATION(S)

The present application claims the benefit of priority under 35 U.S.C. § 119 from U.S. Provisional Patent Application Ser. No. 60/458,549, entitled "REGISTRATION-BASED SIP NAT TRAVERSAL" filed on Mar. 26, 2003, the disclosure of which is hereby incorporated by reference in its entirety for all purposes.

BACKGROUND OF THE INVENTION

The present invention generally relates to network communications and, more specifically, to a method and system for facilitating communications between devices where a network access translation device is used.

Fully functional telephony relies on the ability for any party to call any other party. NAT (Network Access Translation) devices represent a significant barrier to SIP (Session Initiation Protocol) calls. This is because NAT devices prevent SIP clients outside the NAT's domain (NAT-exterior) from calling or reaching a client located within the NAT's domain (NAT-interior). For clarification, a NAT device can be viewed as a dividing point between two networks. Devices behind the NAT device are protected from the devices installed on the network beyond, or outside, the NAT device. Devices connected behind the NAT device are on the interior network, hence they are NAT-interior devices. Those devices not connected behind the NAT device are on the exterior network, hence they are NAT-exterior devices.

By its nature, NAT devices block inbound communication streams, unless a NAT-interior client initiates the communication session. With a NAT device installed, it is practically impossible for a NAT-exterior device to originate a call to a NAT-interior device.

There are several methods presently posed by the industry in response to the foregoing issue including, for example, virtual private networks, STUN servers, SIP-aware NAT devices and proprietary client software/server. All of these solutions, though functional, are complex and require additional, dedicated hardware and/or proprietary software. The proprietary nature of these arrangements, however, hinder their usefulness, because clients are unable to communicate with other servers that do not employ their proprietary protocols. It may be possible for an enterprise (company) to install these types of solutions for their employees. However, these solutions hardly address the goal of ubiquitous communications via SIP.

Hence, it would be desirable to provide a system that is capable of resolving the foregoing problem, as well as others, including facilitating improved communications between devices where a NAT device is involved.

BRIEF SUMMARY OF THE INVENTION

A system for providing network access translation device traversal to facilitate communications is provided. In one embodiment, the system includes a network access translation (NAT) device, a first Session Initiation Protocol (SIP) client located on the interior of the NAT device, a second SIP client located on the exterior of the NAT device, and a proxy server configured to maintain registration information relating to the first SIP client and the NAT device. The proxy server is further configured to allow the second SIP client to initiate contact with the first SIP client and establish a communication session using the registration information. The communication session is established by traversing the NAT device.

The registration information is periodically provided to the proxy server based on a condition including startup of the first SIP client. The registration information includes an Internet Protocol (IP) address abstraction, NAT-translated IP address and port information. The registration information includes information supplied by the first SIP client and the NAT device respectively.

Upon the first SIP client forwarding its portion of the registration information to the proxy server via the NAT device, the NAT device creates a binding for the first SIP client. The binding and the registration information are used to allow the second SIP client to initiate contact and establish the communication session with the first SIP client by traversing the proxy server and the NAT device.

When the second SIP client wishes to initiate contact with the first SIP client, the second SIP client forwards a SIP INVITE command to the proxy server. Upon receiving the SIP INVITE command, the proxy server uses the registration information to identify the NAT device and forwards the SIP INVITE command to the NAT device. Upon the NAT device receiving the SIP INVITE command, the NAT device uses the binding to forward the SIP INVITE command to the first SIP client. Upon the first SIP client accepting the SIP INVITE command, SIP signaling between the first SIP client and the second SIP client can be conducted through the NAT device, the ports being identified by the response that the second SIP client receives from the first SIP client.

In one implementation, the proxy server is part of a telephone gateway.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
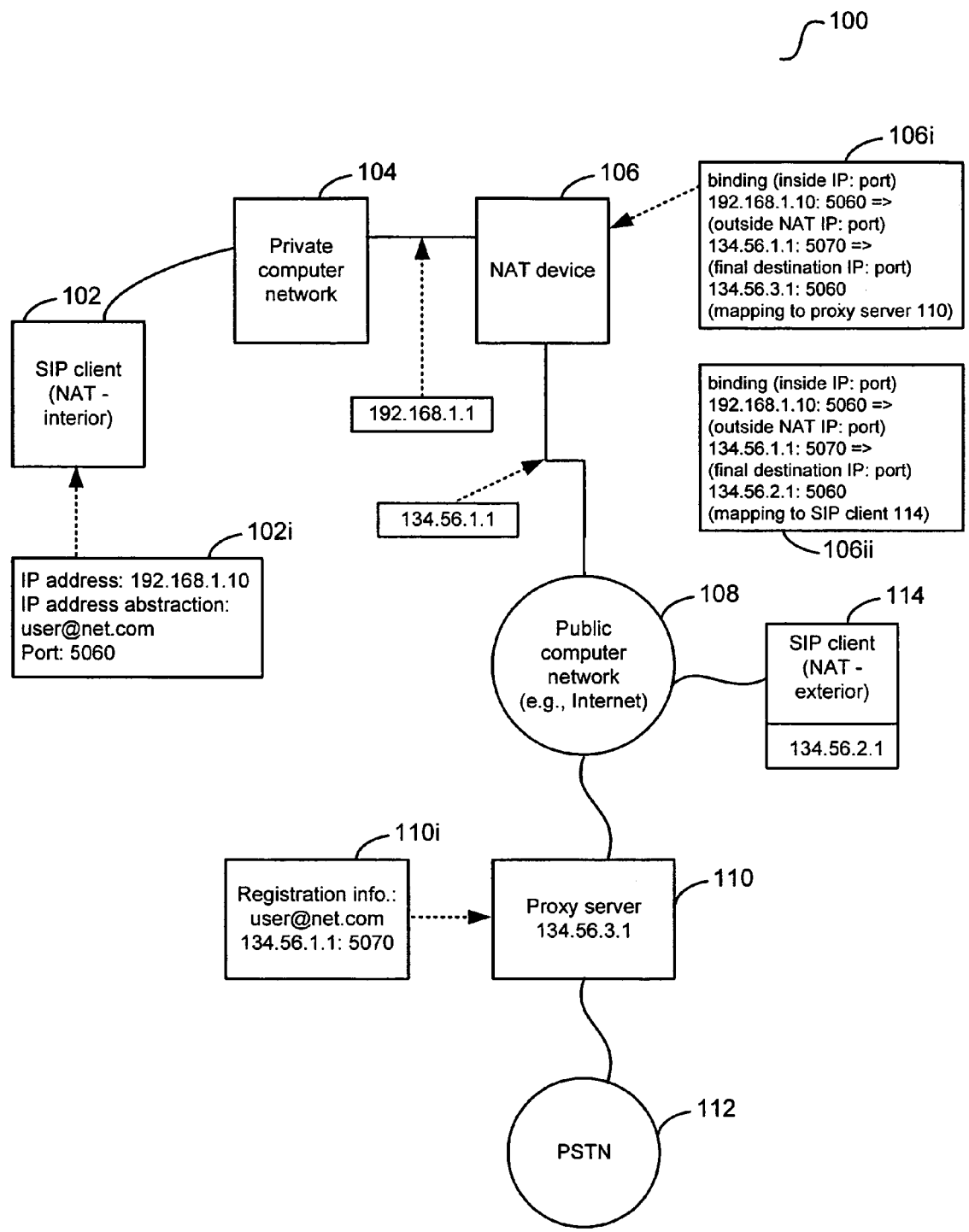
FIG. 1 is a simplified block diagram showing an illustrative configuration of a system according to an embodiment of the present invention.

The present invention in the form of one or more exemplary embodiments will now be described. FIG. 1 is a simplified block diagram showing an illustrative configuration of a system according to an embodiment of the present invention. As shown in FIG. 1, the system 100 includes a SIP client (NAT-interior) 102, a private computer network 104, a network translation access (NAT) device 106, a public computer network 108, a proxy server 110, a public switched telephone network 112 and a SIP client (NAT-exterior) 114.

In one exemplary aspect, the system 100 facilitates communications between the SIP client 102 located in the NAT-interior with the SIP client 114 located in the NAT-exterior as follows. First, the NAT-interior SIP client 102 communicates with the proxy server 110 via the private computer network 104 and the NAT device 106 to provide certain information to the proxy server 110 for registration purposes. The registration information can be provided to the proxy server 110 in a number of ways. For example, the NAT-interior SIP client 102 can be configured to register its relevant information with the proxy server 110 upon startup or other designated condition(s).

The registration information belonging to the NAT-interior SIP client 102 is then recorded and maintained by the proxy server 110 and, as will be further described below, used to establish communications with the NAT-interior SIP client 102. The registration information provided by the NAT-interior SIP client 102 includes, for example, the client name and the source Internet Protocol (IP) address abstraction.

In addition, the proxy server 110 also captures and records relevant information relating to the NAT device 106. Such information includes, for example, the NAT-translated IP address and port information relating to the port on the NAT device 106 that was used to send the registration information to the proxy server 110. This information is added as part of the registration information for NAT-interior SIP client 102. In one implementation, the registration information is stored in a memory device in the form of a lookup table on the proxy server 110.

The private computer network 104 can be any computer network employed by an enterprise (company) to provide network communications. The NAT device 106 can be any device that is capable of handling network access translation and is commonly known in the industry. The proxy server 110 is located outside of the NAT device 106 relative to the NAT-interior SIP client 102.

When the NAT-interior SIP client 102 registers with the SIP proxy server 110 via the NAT device 106, a binding, 106*i*, is created in the NAT device 106. The binding provides a path or link for the proxy server 110 to subsequently reach the NAT-interior SIP client 102 via the NAT device 106.

The proxy server 110, and the registration information for the NAT-interior SIP client 102 maintained thereon, can be used to establish communications between the NAT-interior SIP client 102 and the NAT-exterior SIP client 114. When the NAT-exterior SIP client 114 wishes to call the NAT-interior SIP client 102, the NAT-exterior SIP client 114 first sends a command, such as a SIP INVITE command, and other identification information to the proxy server 110. Other identification information includes, for example, information identifying the NAT-interior SIP client 102. The proxy server 110 then looks up the registration information belonging to the NAT-interior SIP client 102, including the corresponding NAT-translated IP address and port information. Using the registration information, the proxy server 110 then forwards the SIP INVITE command to the NAT device 106 on the IP address and port identified in the registration information. By sending the SIP INVITE command on the registration-derived address/port, rather than the well-known SIP signaling port (5060), the proxy server 110 ensures that the SIP INVITE command will traverse the NAT device 106 using the binding 106*i*.

As mentioned above, a binding 106*i* for the NAT-interior SIP client 102 is created when the NAT-interior SIP client 102 communicates with the proxy server 110 via the NAT device 106 for registration purposes. Since the NAT device 106 is already bound for that (NAT-interior) source IP address and port number, the NAT device 106 is then able to forward the SIP INVITE command to the intended NAT-interior SIP client 102 from the SIP proxy server 110.

Upon receiving the SIP INVITE command, the NAT-interior SIP client 102 establishes communications with the NAT-exterior SIP client 114, creating a new binding 106*ii* in the NAT device 106. The remaining SIP signaling between the NAT-interior SIP client 102 and the NAT-exterior SIP client 114 is then conducted via that port.

In order to prevent the binding 106*i* in the NAT device 106 from expiring, the NAT-interior SIP client 102 periodically communicates with the proxy server 110 via the NAT device 106 to supply the registration information. Or viewed another way, the NAT-interior SIP client 102 periodically registers with proxy server 110 thereby maintaining a valid binding in the NAT device 106. As a result, the NAT-interior SIP client 102 always maintains a valid binding in the NAT device 106, thereby allowing any NAT-exterior SIP client 114 to initiate communications with the NAT-interior SIP client 102 via the proxy server 110. The periodic registration can be achieved for example, as described above, by configuring the NAT-interior SIP client 102 to register with the proxy server 110 upon startup or other designated condition(s).

Referring to FIG. 1, the operations of the system 100 is further illustrated with the following example. Registration information associated with the NAT-interior SIP client 102 is shown as information 102*i* including its IP address (192.168.1.10), IP address abstraction (user@net.com) and port information (5060). Information for the binding created when the NAT-interior SIP client 102 registers with the proxy server 110 is shown as information 106*i*. In this example, the binding information 106*i* shows that the private IP address and port (192.168.1.10:5060) is associated with public IP address and port (134.56.1.1:5070) and final destination IP address and port (134.56.3.1:5060). Port (5060) is used to transmit traffic to and from the NAT-interior SIP client 102 and port (5070) is used to transmit traffic to and from the SIP proxy server 110.

For registration, the NAT-interior SIP client 102 forwards a registration request (having registration information described above) to the NAT device 106 which, in turn, forwards the registration request to the proxy server 110 in a registration packet. The proxy server 110 compares the IP address contained within the registration request with the source IP address for the (registration) packet (the source IP address of the registration packet is the NAT device's 106 IP address). If they do not match, the proxy server 110 can infer that the client is probably behind a NAT device 106. In such circumstances, any SIP message from the SIP proxy server 110 to the NAT-interior SIP client 102 should be forwarded to the NAT device's IP address, and not the IP address and port contained within the registration request.

Upon registration, the proxy server 110 records the registration information relating to the NAT-interior SIP client 102 shown as information 110*i* including the IP address abstraction (user@net.com), the NAT-translated IP address (134.56.1.1) and port information (5070). Note, that the NAT-translated IP address comes from the registration packet itself, and the IP address and port inside the registration request (192.168.1.10:5060) are discarded.

When the NAT-exterior SIP client 114 wishes to establish a communication session with the NAT-interior SIP client 102, the NAT-exterior SIP client 114 sends a SIP INVITE command to the proxy server 110. The SIP INVITE command includes, for example, the IP address abstraction (user@net.com) that corresponds to the NAT-interior SIP client 102. Using information from the SIP INVITE command, such as the IP address abstraction, the proxy server 110 locates the relevant registration information 110*i* for the NAT-interior SIP client 102. The relevant registration information 110*i* including the NAT-translated IP address (134.56.1.1) and port information (5070) is then used to contact the NAT-interior SIP client 102. The NAT-translated IP address (134.56.1.1) identifies the appropriate NAT device 106 and the port information (5070) identifies the appropriate port on the NAT device 106 that can be used to establish contact with the NAT-interior SIP client 102. The proxy server 110 then forwards the SIP INVITE command to the NAT device 106 via port (5070) based on the relevant registration information 110i.

The NAT device 106 subsequently retrieves the corresponding binding information 106i. Using the binding information 106i, the NAT device 106 identifies the port (5060) that is registered to the NAT-interior SIP client 102 and forwards the SIP INVITE command to the NAT-interior SIP client 102.

Once the NAT-interior SIP client 102 has processed and accepted the SIP INVITE command, SIP signaling between the NAT-interior SIP client 102 and the NAT-exterior SIP client 114 can be initiated, creating a new binding 106ii in the NAT device 106.

Subsequent communications between the NAT-interior SIP client 102 and the NAT-exterior SIP client 114 can be achieved through the NAT device 106 using the newly created binding 106ii.

In an exemplary implementation, the present invention is implemented using software in the form of control logic, in either an integrated or a modular manner. Alternatively, hardware or a combination of software and hardware can also be used to implement the present invention. Based on the disclosure and teachings provided herein, a person of ordinary skill in the art will know of other ways and/or methods to implement the present invention.

In an exemplary implementation, the present invention is implemented as part of a telephone gateway. Based on the disclosure and teachings provided herein, a person of ordinary skill in the art will know of other ways and/or methods to deploy the present invention.

Based on the disclosure and teachings provided herein, it should also be clear to a person of ordinary skill in the art that the present invention requires neither proprietary clients, nor dedicated, specialized servers. The present invention builds upon current industry standards. Fully functional communication is possible with small architectural changes within client devices that are commonly available in the industry and such changes do not affect the client device's compliance with SIP standards. Such client devices coupled with the proxy server as described above provide seamless Internet telephony services regardless of NAT installations.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for providing network access translation device traversal to facilitate communications, comprising:
    a network access translation (NAT) device;
    a first Session Initiation Protocol (SIP) client located on the interior of the NAT device;
    a second SIP client located on the exterior of the NAT device; and
    a proxy server configured to maintain registration information relating to the first SIP client and the NAT device;
    wherein the NAT device creates a first binding for communication with a registration port of the first SIP client in response to registration information sent from the first SIP client to the proxy server,
    wherein the proxy server provides registration information relating to the first SIP client to the second SIP client and forwards at least one command from the second SIP client to the first SIP client using the first binding, and
    wherein the communication session bypasses the proxy server and traverses the NAT device in accordance with a second binding between the registration port of the first SIP client and a port of the second SIP client.

2. The system of claim 1 wherein the registration information is periodically provided to the proxy server based on a condition.

3. The system of claim 2 wherein the condition includes startup of the first SIP client.

4. The system of claim 1 wherein the registration information includes an Internet Protocol (IP) address abstraction, NAT-translated IP address and registration port information.

5. The system of claim 1 wherein some of the registration information is provided to the proxy server by the first SIP client via the NAT device;
    wherein some of the registration information is provided to the proxy server by the NAT device;
    wherein upon the first SIP client forwarding some of the registration information to the proxy server via the NAT device, the NAT device creates the first binding; and
    wherein the first binding and the registration information are used to allow the second SIP client to initiate contact with the first SIP client by traversing the proxy server and the NAT device.

6. The system of claim 1 wherein the proxy server is part of a telephone gateway.

7. A system for providing network access translation device traversal to facilitate communications, comprising:
    a network access translation (NAT) device;
    a first Session Initiation Protocol (SIP) client located on the interior of the NAT device;
    a second SIP client located on the exterior of the NAT device; and
    a proxy server configured to receive registration information relating to the first SIP client and the NAT device over a first communication path through the NAT device, the first communication path terminating at a registration port of the first SIP device,
    wherein the proxy server uses the registration information to initiate contact with the first SIP client on behalf of the second SIP client over the first communication path and to establish a communication session between the first and second SIP clients;
    wherein the communication session bypasses the proxy server and traverses the NAT device such that the first SIP client receives communications from the second SIP client at the registration port.

8. The system of claim 7 wherein the registration information is periodically provided to the proxy server based on a condition.

9. The system of claim 8 wherein the condition includes startup of the first SIP client.

10. The system of claim 7 wherein the registration information includes an Internet Protocol (IP) address abstraction, NAT-translated IP address and port information.

11. The system of claim 7 wherein the registration information includes information supplied by the first SIP client and the NAT device respectively;
    wherein upon the first SIP client forwarding its portion of the registration information to the proxy server via the NAT device, the NAT device creates a binding for the first SIP client; and wherein the binding and the registration information are used to allow the second SIP client to initiate contact and establish the communication session with the first SIP client by traversing the proxy server and the NAT device.

12. The system of claim 11 wherein when the second SIP client wishes to initiate contact with the first SIP client, the second SIP client forwards a SIP INVITE command to the proxy server;
   wherein upon receiving the SIP INVITE command, the proxy server uses the registration information to identify the NAT device and forwards the SIP INVITE command to the NAT device;
   wherein upon the NAT device receiving the SIP INVITE command, the NAT device uses the binding to forward the SIP INVITE command to the first SIP client; and
   wherein upon the first SIP client accepting the SIP INVITE command, SIP signaling between the first SIP client and the second SIP client can be conducted through the NAT device directly.

13. The system of claim 7 wherein the proxy server is part of a telephone gateway.

14. A proxy server for providing network access translation device traversal to facilitate communications, comprising:
   a lookup table configured to store registration information relating to a first Session Initiation Protocol (SIP) client and a network access translation (NAT) device, the registration information enabling communication with a registration port of the first SIP client over a first communication path through the NAT device; and
   control logic configured to use the registration information to allow a second SIP client to initiate contact over the first communication path and establish a communication session with the first SIP client, the second SIP client being located on the exterior of the NAT device and the first SIP client being located on the interior of the NAT device;
   wherein the proxy server assists in the creation of a second communication path through the NAT device for the communication session, the second communication path connecting the registration port of the first SIP client and a port of the second SIP client such that communication between the first and second SIP client bypasses the proxy server.

15. The proxy server of claim 14 further comprising:
   control logic configured to receive a SIP INVITE command from the second SIP client upon the second SIP client wishing to initiate contact with the first SIP client; and
   control logic configured to use the registration information to identify the NAT device and forward the SIP INVITE command to the NAT device over the first communication path;
   wherein upon receiving the SIP INVITE command, the NAT device forwards the SIP INVITE command to the registration port of the first SIP client;
   wherein upon the first SIP client accepting the SIP INVITE command, SIP signaling between the first SIP client and the second SIP client can be conducted over the second communication path.

16. The proxy server of claim 14 wherein the registration information is provided to the proxy server upon the first SIP client contacting the proxy server via the NAT device for registration.

17. The proxy server of claim 16 wherein the first SIP client contacts the proxy server to provide registration information upon startup.

18. The proxy server of claim 14 wherein the registration information includes an Internet Protocol (IP) address abstraction for the first SIP client, a NAT-translated IP address and port information.

19. A telephone gateway incorporating the proxy server as recited in claim 14.

20. A method for providing network access translation device traversal to facilitate communications, comprising:
   maintaining registration information relating to a first Session Initiation Protocol (SIP) client and a network access translation (NAT) device on a proxy server, the registration information enabling communication with a registration port of the first SIP client over a first communication path through the NAT device; and
   using the registration information to allow a second SIP client to initiate contact and with the first SIP client over the first communication path, the first SIP client being located on the interior of the NAT device, the second SIP client being located on the exterior of the NAT device;
   wherein the second SIP client uses the proxy server to initiate communication with the first SIP client over the first communication path;
   wherein the first SIP client contacts the second SIP client through the NAT device using information sent in a SIP INVITE command from the proxy server, causing a second communication path; and
   wherein the second communication path bypasses the proxy server and traverses the NAT device such that the first SIP client receives communications from the second SIP client at the registration port.

21. The method of claim 20 further comprising:
   upon the second SIP client wishing to contact and establish the communication session with the first SIP client, directing the second SIP client to forward the SIP INVITE command to the proxy server;
   directing the proxy server to use the registration information to identify the NAT device and forward the SIP INVITE command to the NAT device over the first communication path;
   upon receipt of the SIP INVITE command, directing the NAT device to use a binding associated with the first SIP client to forward the SIP INVITE command to the registration port of the first SIP client; and
   upon the first SIP client accepting the SIP INVITE command, conducting SIP signaling between the first SIP client and the second SIP client, using information contained in the SIP INVITE command, over the second communication path and causing a new binding to be created between a port of the second SIP client and the registration port of the first SIP client.

22. The method of claim 20 further comprising:
   providing the registration information to the proxy server upon the first SIP client contacting the proxy server via the NAT device for registration.

23. The method of claim 22 wherein the first SIP client contacts the proxy server to provide registration information upon startup.

24. The method of claim 20 wherein the registration information includes an Internet Protocol (IP) address abstraction for the first SIP client, a NAT-translated IP address and port information.

25. A telephone gateway utilizing the method as recited in claim 20.

26. A method for providing network access translation device traversal to facilitate communications, comprising:
   directing a network access translation device (NAT) to create a first communication path to a registration port of a recipient SIP client coupled to the NAT device in response to a registration function of the recipient SIP client;

directing a proxy server to receive an Session Initiation Protocol (SIP) INVITE command issued from an initiating SIP client upon the initiating SIP client wishing the initiate contact and establish a communication session with the recipient SIP client, the initiating SIP client being located on the exterior of the network access translation (NAT) device and the recipient SIP client being located on the interior of the NAT device;

directing the proxy server to use registration information relating to the recipient SIP client and the NAT device to identify the NAT device and forward the SIP INVITE command to the NAT device over the first communication path;

upon receipt of the SIP INVITE command, directing the NAT device to use a binding associated with the recipient SIP client to forward the SIP INVITE command to the registration port of the recipient SIP client; and upon the recipient SIP client accepting the SIP INVITE command, conducting SIP signaling between the registration port of the recipient SIP client and the initiating SIP client, using information contained in the SIP INVITE command, through the NAT device, and causing new binding information to be created.

27. The method of claim 26 further comprising:

providing the registration information to the proxy server upon the recipient SIP client contacting the proxy server over the first communication path in connection with the registration function.

28. The method of claim 27 wherein the recipient SIP client contacts the proxy server to provide registration information upon startup.

29. The method of claim 26 wherein the registration information includes an Internet Protocol (IP) address abstraction for the first SIP client, a NAT-translated IP address and port information.

30. A telephone gateway utilizing the method as recited in claim 26.

* * * * *